(12) United States Patent
Hacikyan (10) Patent No.: US 8,647,731 B2
(45) Date of Patent: Feb. 11, 2014

(54) PURGE DAM FOR RETAINING PURGE GAS AROUND A WELD ZONE

(76) Inventor: Michael Hacikyan, Amherst, NY (US)

( * ) Notice: Subject to any disclaimer, the term of this patent is extended or adjusted under 35 U.S.C. 154(b) by 212 days.

(21) Appl. No.: 13/059,996

(22) PCT Filed: Aug. 21, 2008

(86) PCT No.: PCT/US2008/073918
§ 371 (c)(1),
(2), (4) Date: Feb. 21, 2011

(87) PCT Pub. No.: WO2010/021628
PCT Pub. Date: Feb. 25, 2010

(65) Prior Publication Data
US 2011/0151166 A1      Jun. 23, 2011

(51) Int. Cl.
*B32B 9/00* (2006.01)
*B32B 33/00* (2006.01)
*B32B 7/00* (2006.01)
*F16L 55/10* (2006.01)

(52) U.S. Cl.
USPC ....... 428/40.1; 428/41.7; 428/41.8; 428/42.2; 428/43; 428/119; 138/89; 138/94; 219/61; 219/74; 228/42; 228/49.3; 228/219

(58) Field of Classification Search
USPC ............... 428/40.1, 41.7, 41.8, 42.2, 43, 119, 428/192, 194; 138/89, 98; 219/61, 74; 228/42, 49.3, 219
See application file for complete search history.

(56) References Cited

U.S. PATENT DOCUMENTS

| | | |
|---|---|---|
| 3,736,400 A | 5/1973 | Spiegel et al. |
| 4,916,281 A | 4/1990 | Flasche et al. |
| 5,187,343 A | 2/1993 | Edwards |
| 5,390,846 A | 2/1995 | Thode |
| 5,583,305 A | 12/1996 | Hirsch et al. |
| 5,669,547 A | 9/1997 | Spring |

(Continued)

FOREIGN PATENT DOCUMENTS

| | | |
|---|---|---|
| JP | 06-23685 | 3/1994 |
| KR | 20-0159923 | 11/1999 |
| KR | 20-0179895 | 4/2000 |

OTHER PUBLICATIONS

PCT International Searching Authority, "Notification of Transmittal of the International Search Report and the Written Opinion of the International Searching Authority, or the Declaration", PCT Application No. PCT/ US2008/073918, May 21, 2009, 11 pages.

(Continued)

*Primary Examiner* — Patricia Nordmeyer
(74) *Attorney, Agent, or Firm* — Walter W. Duft (57) ABSTRACT

A purge dam for retaining a purge gas around a weld zone includes a purge dam structure configured to substantially obstruct an air passage leading to the weld zone. The purge dam includes a main blocking portion configured to substantially block the air passage. The purge dam structure further includes a wall portion configured to engage the air passage for attachment. Adhesive can be optionally provided on the wall portion to facilitate the air passage attachment. Some or all of the purge dam structure may be formed as a multi-layer structure that includes one or more layers of water degradable paper and one or more layers of water degradable polymer. If present, the optional adhesive may be applied to the water degradable polymer layer. The purge dam may be installed by placing the purge dam in the air passage and adhering the wall portion thereto.

20 Claims, 6 Drawing Sheets

(56) References Cited

U.S. PATENT DOCUMENTS

| | | |
|---|---|---|
| 5,785,235 A | 7/1998 | Beatty |
| 7,112,358 B1 | 9/2006 | Hacikyan |
| 2004/0022676 A1 | 2/2004 | Hamilton et al. |
| 2004/0089665 A1 | 5/2004 | Nnamani |
| 2005/0072809 A1 | 4/2005 | Pantelleria et al. |

OTHER PUBLICATIONS

Ab Paper Co., "Shur-Purge", Jan. 1, 1997, 5 pages.
Intercon, "Water-Soluble Purge Paper", Oct. 1, 2002, 5 pages.
Gilbreth, "Dissolvo", 2001, 8 pages.

PURGE DAM FOR RETAINING PURGE GAS AROUND A WELD ZONE

BACKGROUND OF THE INVENTION

1. Field of the Invention

The present invention relates generally to inert gas welding. More particularly, the invention is directed to purge dam constructions for retaining purge gas around a weld zone.

2. Description of Prior Art

When welding together pipes and other enclosed structures using inert gas welding, it is desirable to purge the interior of the pipe or structure in the vicinity of the weld zone to prevent corrosion and the formation of oxides on the interior side of the weld pool. Purge dams are conventionally used for this purpose. For example, when welding the ends of two pipe sections to form a consolidated pipe run, two purge dams are placed in the pipes, one in each pipe on either side of the weld zone. A purge gas can then be introduced into the area between the dams, usually by way of a needle injector inserted through a gap in the pipe end interface to be welded, to drive off the atmospheric contaminants. The present application is directed to improvements in purge dam construction.

SUMMARY OF THE INVENTION

A purge dam for retaining a purge gas around a weld zone includes a purge dam structure configured to substantially obstruct an air passage leading to the weld zone. The purge dam includes a main blocking portion configured to substantially block the air passage. The purge dam structure further includes a wall portion configured to engage the air passage for attachment. Adhesive can be optionally provided on the wall portion to facilitate the air passage attachment. Some or all of the purge dam structure may be formed as a multi-layer structure that includes one or more layers of water degradable paper and one or more layers of water degradable polymer. If present, the optional adhesive may be applied to the water degradable polymer layer. The purge dam may be installed by placing the purge dam in the air passage and adhering the wall portion thereto.

BRIEF DESCRIPTION OF THE DRAWINGS

The foregoing and other features and advantages of the invention will be apparent from the following more particular description of example embodiments, as illustrated in the accompanying Drawings in which.

DETAILED DESCRIPTION OF PREFERRED EMBODIMENTS

Turning now to the Drawings, which are not necessarily to scale, example purge dam constructions are set forth by way of illustration only to illustrate how the principles of the disclosed subject matter may be implemented in practice. Each of the illustrated constructions includes a non-adhesive portion and an optional adhesive portion. The non-adhesive portion is comprised of materials that are substantially impermeable to purge gas when it is introduced into a weld zone at a normal operational pressure. On the other hand, the materials should be capable of degrading and dispersing when contacted by a chemical agent (e.g., water) or a force (e.g., air or water pressure) that is greater than the operational pressure of the purge gas. Water degradable materials, such as water soluble paper, polyvinyl alcohol film, etc., are examples of materials that may be used, provided the proper thickness or grade is selected to withstand the operational purge gas pressure. Such materials are convenient because water is often used for pressure testing welded pipelines, and will thus clear the pipe of purge dam material. A water soluble paper is commercially available from Aquasol Corporation of North Tonawanda, N.Y. under the trademark Aquasol®. The Aquasol® brand paper is made of Sodium Carboxy Methyl cellulose and wooden pulp that dissolves rapidly and completely in most liquids, including water. Non-water soluble paper, such as tissue paper, may also be used as a purge dam material provided it has a thickness or grade that is capable of withstanding operational purge gas pressures, yet will rupture when a larger force (e.g., air or water pressure) is applied.

If the purge dam is provided with an adhesive portion, water degradable adhesive is generally preferred. Such adhesives are sold by Aquasol Corporation and other vendors. Non-water degradable adhesives may also be used if the presence of adhesive residue following purge dam removal can be tolerated. For example, in welding pipe, there may be applications where the presence of adhesive material on the pipe wall is not a problem so long as the remainder of the purge dam is substantially removed to allow the free flow of material through the pipe.

Figure 1:
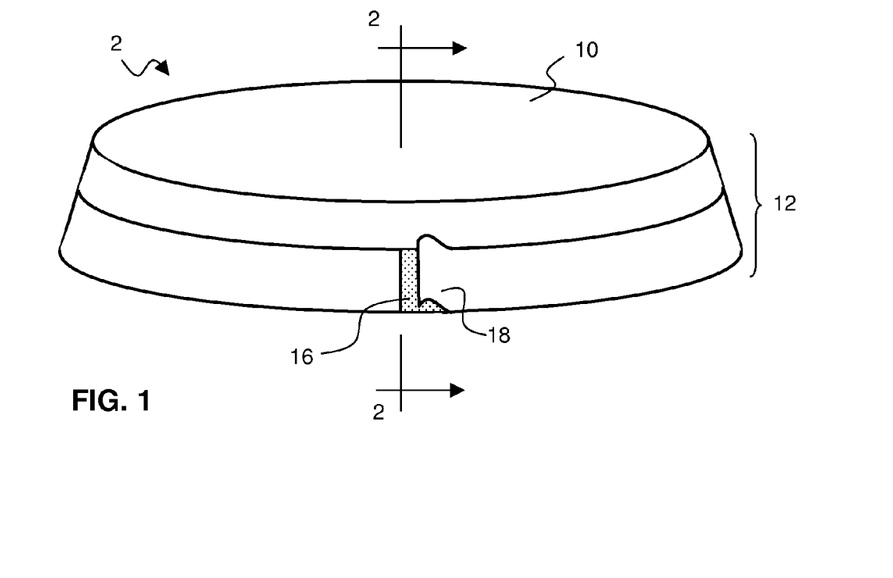
FIG. 1 is perspective view of an example purge dam.
Figure 2:
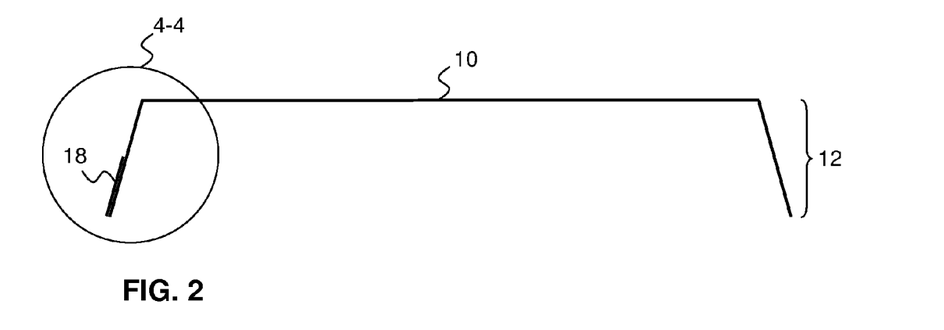
FIG. 2 is a cross-sectional view taken substantially along line 2-2 in FIG. 1.
Figure 3:
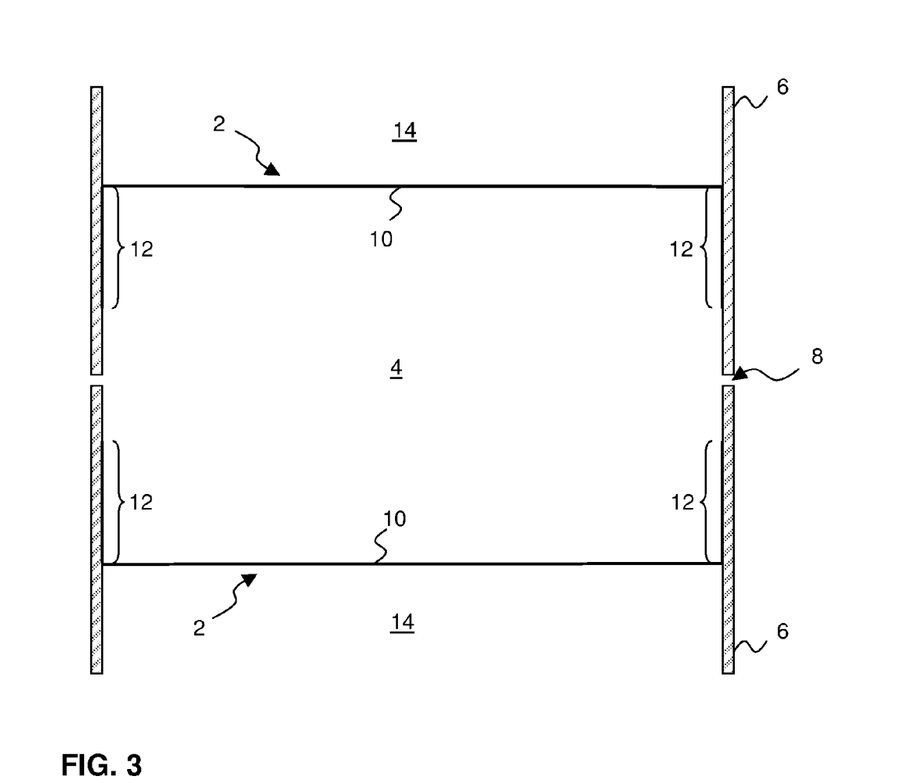
FIG. 3 is a cross-sectional centerline view of a pair of the purge dams of FIG. 1 installed around a weld zone.

Turning now to FIGS. 1-3, a purge dam 2 (in conjunction with a second purge dam 2 of like construction) is adapted for retaining a purge gas around a weld zone 4 within a pair of pipes 6 (or other structures) to be welded together. In FIG. 3, the weld zone is the area where the interfacing ends of the pipes 6 are arranged to receive a circumferential weld at the location identified by reference number 8. The purge dam 2 has a purge dam structure that includes a main blocking portion 10 and a side wall portion 12. The purge dam structure can be shaped, by way of example only, as a shallow pan. Other shapes may also be used, including but not limited to cones, frustocones, and other straight-wall configurations, as well as parabolic, semi-spherical and other curved-wall configurations.

In the example configuration of FIGS. 1-3, the main blocking portion 10 is substantially planar and disk shaped. As shown in FIG. 2, the wall portion 12 can be nominally shaped as a frustocone. As shown in FIG. 3, the wall portion 12 can be flexed inwardly to a substantially tubular shape during installation of the purge dam 2. The amount of inward flexing required will depend on the size of air passage 14 defined by the interior diameter of each pipe 6. The angle between the wall portion 12 and an axis extending perpendicularly to the plane of the main blocking portion 10 may vary according to design requirements and the size of the purge dam. Smaller purge dams 2 that are less than 24 inches in diameter can be made relatively thin and flexible. For such purge dams, the angle of the wall portion 12 may be range from 10-20 degrees (or more), with 15 degrees being typical. Larger purge dams 2 that are more than 24 inches in diameter tend to become increasingly thick and stiff in order to withstand large purge gas pressures. For such purge dams, the angle of the wall portion 12 may be range from 2-10 degrees, with 5 degrees being typical.

Although the air passage 14 represents the interior of the pipes 6 in FIG. 3, there may be other situations in which it is necessary to block one or more additional air passages. This could occur, for example, if there was a separate branch pipe (not shown) that opened to the weld zone 4 in FIG. 2. In that case, there might be one purge dam 2 in the branch pipe and two more purge dams 2 in the pipes 6 being welded. Although not shown, a small opening can be formed in the main blocking portion 10 of one or both purge dams 2 in order to provide an escape path for the release of ambient air that is displaced by purge gas introduced into the weld zone 4, and to control purge gas pressure.

With continuing reference to FIGS. 1-3, adhesive 16 may be provided on the wall portion 12 for adhering the purge dam 2 to the pipe 6. The adhesive 12 may extend circumferentially continuously around the wall portion 12. Alternatively, the adhesive 12 could be placed at discrete locations (e.g., spot coated) around the wall portion circumference. The adhesive 12 can be applied in liquid form via spraying, brushing, roll coating, dipping or the like onto the wall portion 12. Alternatively, a prefabricated adhesive strip may be used, as described in more detail below. If the adhesive 12 is not provided on the wall portion 12, separate attachment members, such as adhesive tape (not shown), may be used to secure the purge dam 2 to the air passage 14.

If the adhesive 12 is provided on purge dam 2, an optional removable backing 18 may be used to cover the adhesive 16 until the purge dam 2 is ready to be installed. Cases where the adhesive backing 16 would not be required include constructions in which the purge dam 2 is placed in a protective enclosure, such as an envelope, pouch or other package. Another alternative is to use an adhesive 16 that can remain on the purge dam 2 in a dry state until it is wetted (like the adhesive on an envelope or postage stamp). Note that a wettable adhesive may preclude use of water degradable materials for the purge dam 2. Alternatively, a non-aqueous adhesive wetting agent may be used. It will thus be seen that there are various alternative methods by which the adhesive 16 can be prevented from adhering until installation time.

At installation time, the purge dam 2 may be prepared by peeling off the removable backing 18 (if present) or otherwise exposing or activating the adhesive 16 (if present) for adhesion. The purge dam 2 may be placed in the pipe 6 so that the wall portion 12 faces the open end of the pipe. The adhesive 16 (if present) is pressed against the sides of the air passage 14 defined by the pipe interior wall. Alternatively, if the adhesive 16 is not present, an adhesive tape may be applied circumferentially around the inside terminal edge of the wall portion 12 and also adhered to the air passage 14. Installing the two purge dams 2 of FIG. 3 in this manner allows the weld zone 4 to be sealed off from the ambient environment so that it can be purged of atmospheric contaminants (using conventional techniques).

If the purge dam 2 comprises a material that is air-permeable, such as some grades of paper, another layer of air-impermeable material, such as a polymer, may be provided. Such air impermeability is sometimes desirable for critical welding environments, such as piping at nuclear power plants. The addition of a polymer may obviate the need to increase the thickness of the paper to reduce air-permeability, thus allowing the purge dam to be made as thin and flexible as possible. The polymer may also facilitate the use of adhesives that might otherwise bleed into a paper layer, thereby decreasing adhesive effectiveness. The polymer can thus serve as a blocking layer that prevents adhesive migration into the paper. If water soluble paper is used for one or more layers of the purge dam 2, a water soluble polymer may be used to provide air-impermeability. One such polymer is polyvinyl alcohol, also known as PVA, PVAL and PVOH. Pre-fabricated laminates comprising water soluble paper and polyvinyl alcohol are available from commercial sources. Other water degradable polymers could potentially also be used, as could polymers that are degradable in other liquids.

Figure 4:
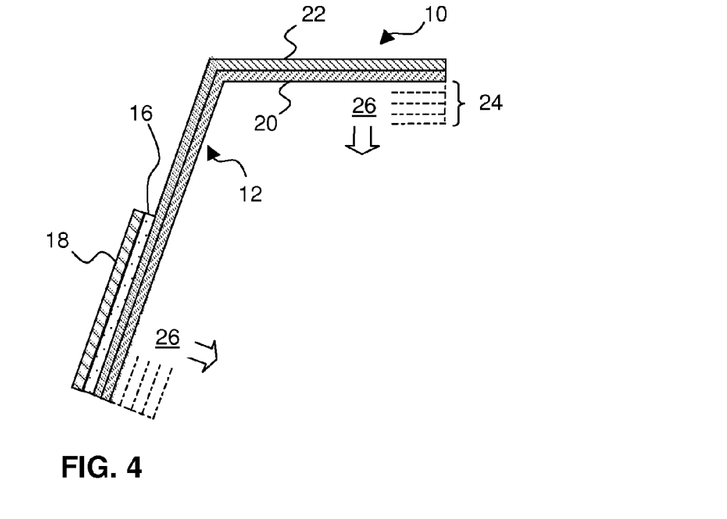
FIG. 4 is an enlarged cross-sectional view of a portion of the purge dam of FIG. 1 in the region shown by inset 4-4 in FIG. 2.

Turning now to FIG. 4, an example multiple-layer construction for the purge dam 2 is shown. In this construction, the main blocking portion 10 and the wall portion 12 are formed with a layer of air permeable material 20 and a layer of air impermeable material 22. By way of example only, the air permeable layer 20 may comprise water soluble paper and the air-impermeable layer 22 may comprise a water soluble polymer such as polyvinyl alcohol. The air-impermeable material 22 faces outwardly so that the wall portion 12 may receive the adhesive 16. The removable backing 18 covers the adhesive 16. Additional layers 24 of the same or different material may be provided as needed, as shown by the arrows 26. These additional layers may be fabricated with the layers 20 and 22 as multiple-layer structures, or they may be added during fabrication of the purge dam 2.

Multiple-layer structures may be fabricated using a variety of techniques. These techniques include, but are not limited to, lamination, coextrusion or coating operations that produce multilayer (e.g., bi-layer, tri-layer, etc.) sheets. For example, if the purge dam 2 comprises a bi-layer of water soluble paper and water soluble polymer, the polymer layer can be preformed as a film and then laminated or co-extruded with the paper layer. Another bi-layer forming technique would be to spray or otherwise coat the polymer layer in liquid form onto the paper layer. Multiple-layer structures may also be fabricated by forming, assembling and gluing individual layers or individual subassemblies comprising prefabricated multi-layer sheets.

The number and arrangement of material layers used to construct the purge dam 2 will depend on the thickness of the individual layers and the size of the purge dam. Small purge dams (e.g., 2 to 24 inches in diameter) might require only 1, 2, 4 or 6 layers of relatively thin paper (or paper and polymer). Larger purge dams (e.g., 24, 48, 72 or more inches in diameter) may require 8, 12, 24 or more layers of paper (or paper and polymer). Otherwise, the purge dam 2 may be too flimsy to withstand the operational purge gas pressure in the weld zone 4. If the purge dam 2 comprises layers made from different materials, the layers may be arranged in any desired combination. For example, if the purge dam comprises layers of water soluble paper and water soluble polymer, the paper and polymer layers could be interleaved with each other. Alternatively, the layers of each material could be grouped together. The number of layers of each material type could also be varied. For example, there might be several layers of water soluble paper and only a single layer of water soluble polymer.

The use of many relatively thin layers instead of fewer relatively thick layers can facilitate construction of the purge dam 2. This is because its easier to cut, fold, crimp, bend, glue, fasten or otherwise manipulate the thin material into desired purge dam shapes. Even though each individual layer may be too thin and flexible by itself, the desired strength and stiffness can be provided by adding additional material layers to build up the thickness of the purge dam structure. Alternatively, the purge dam 2 can be constructed by using relatively thick materials (e.g., to pre-form the main blocking portion 10 and the wall portion 12), but by interconnecting these materials using thin flexible interconnecting elements. The interconnections can then be built up and strengthened with one or more additional material layers.

FIGS. 5A-5F illustrates a combination of the foregoing techniques. According to this embodiment, the main blocking portion 10 of the purge dam 2 is formed by a pre-fabricated base member (described in more detail below) comprising one or more layers of material that substantially provide the strength and stiffness required to withstand anticipated purge gas pressures. The wall portion 12 of the purge dam 2 is formed by an adhesive strip assembly (described in more detail below) that is adhered to the base member. The adhesive strip assembly is partially prefabricated and comprises one or more layers of material. Additional layers can be added after the adhesive strip assembly is attached to the base member. The attachment between the base member and the adhesive strip assembly is provided by flexible interconnection elements formed as part of the adhesive strip assembly. Following interconnection, the interconnection can be built up with additional layers.

Figure 5A:
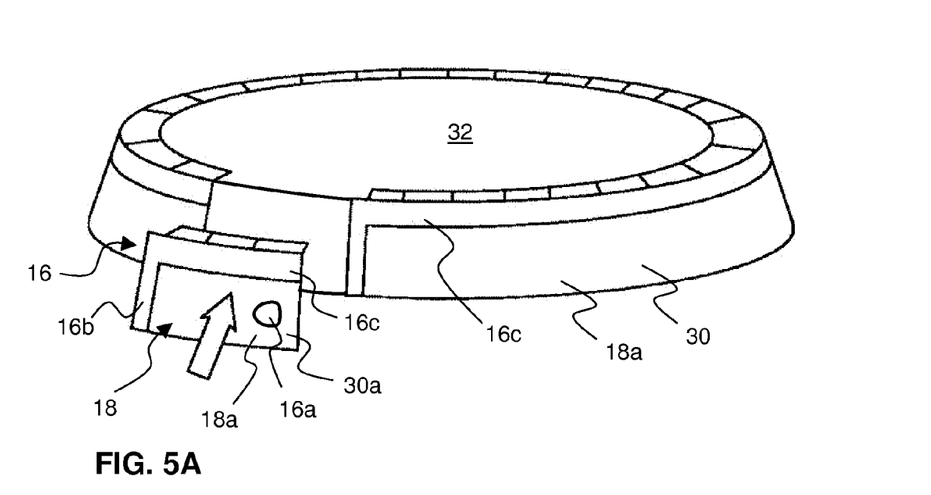
FIG. 5A is an exploded perspective view showing one stage of an example technique for constructing the purge dam of FIG. 1.

In FIG. 5A, the above-mentioned adhesive strip assembly is shown by reference number 30. It can be formed from one or more (e.g., six) adhesive strip segments 30a that are secured together. Assembly of the adhesive strip segments can be facilitated by placing them on a frustoconical mandrel 32 or other suitable support. Each adhesive strip segment may be prefabricated from one or more layers of material (including water degradable paper and polymer layers) to create an adhesive strip substrate of desired strength, stiffness and material(s). One side of the substrate may be covered with the adhesive 16, and the removable backing 18 may be placed over the adhesive. For ease of assembly, the removable backing 18 may be die cut into backing segments that can be selectively removed to expose different areas of the adhesive 16. In FIG. 5A, only one backing segment 18a remains on the wall of the adhesive strip segment 30a. It covers an adhesive region 16a that may be used to adhere additional adhesive strip layers to build up the wall portion 12 of the purge dam 2. Alternatively, if no additional adhesive strip layers are added, the adhesive region 16a will be used to adhere the purge dam 2 to the air passage 14 during installation. The remaining backing segments having been removed to expose corresponding adhesive regions that are used for purge dam fabrication only. A vertical adhesive region 16b on one side of each adhesive strip segment 30a is exposed in order to interconnect adjacent adhesive strip segments 30a into a continuous ring that forms the adhesive strip assembly 30. A horizontal adhesive region 16c extending along a medial portion the adhesive strip segment 30a is exposed to mount a cover element of the main blocking portion of the purge dam 2 (as described in more detail below in connection with FIG. 5D). The medial region of each adhesive strip segment 30a extends from the upper edge of the removable backing 18a to the base of a set of folded interconnection flaps on the adhesive strip segment that are used for interconnecting the adhesive strip assembly 30 to the aforementioned base member.

Figure 5B:
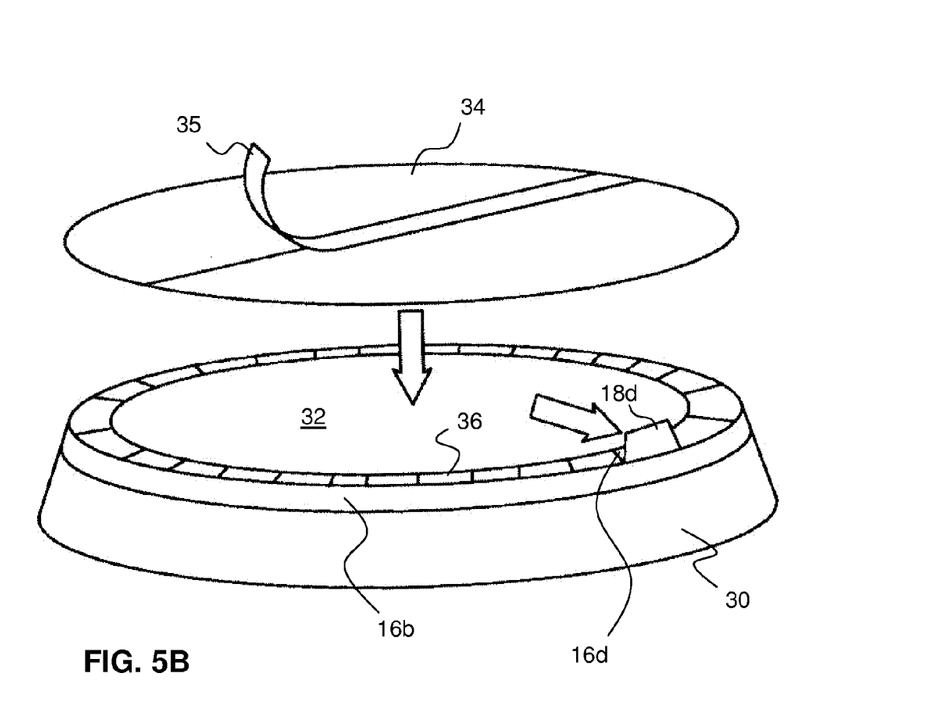
FIG. 5B is an exploded perspective view showing another construction stage.

Turning now to FIG. 5B, the base member is shown by reference number 34. It may be placed on top of the mandrel 32 and attached to the adhesive strip assembly 30 to form the main blocking portion 10 of the purge dam 2. The base member 34 can be prefabricated from one or more material layers (including water degradable paper and polymer layers) to provide the desired strength, stiffness and material(s). As shown, the base member 34 may be formed from two semicircular sections that are suitably joined together, such as by water degradable tape 35. To facilitate the attachment of the base member 34 to the adhesive strip assembly, each adhesive strip segment 30a may be provided with interconnection flaps 36 (referred to in the preceding paragraph) that rest on top of the mandrel 32. The flaps 36 can be made of thin flexible material that can be folded onto the mandrel 32. A crease may be formed at the base of each flap to facilitate folding. The flap material will typically be thinner than the nominal thickness of the remaining portions of the adhesive strip assembly 30, and also thinner than the base member 34. This may be achieved by forming the flaps 36 as extensions of one or more (but not all) of the adhesive strip substrate layers. Each flap 36 may include a layer of the adhesive that forms an adhesive region 16d. The adhesive region 16d is covered by a segment 18d of the removable backing 18. Each of the removable backings 18d is removed when it is desired to expose the adhesive region 16d of each flap 36 for attachment to the base member 34. Collectively, the flaps 36 provide an interconnection structure between the wall portion of the adhesive strip assembly 30 and the base member 32.

Figure 5C:
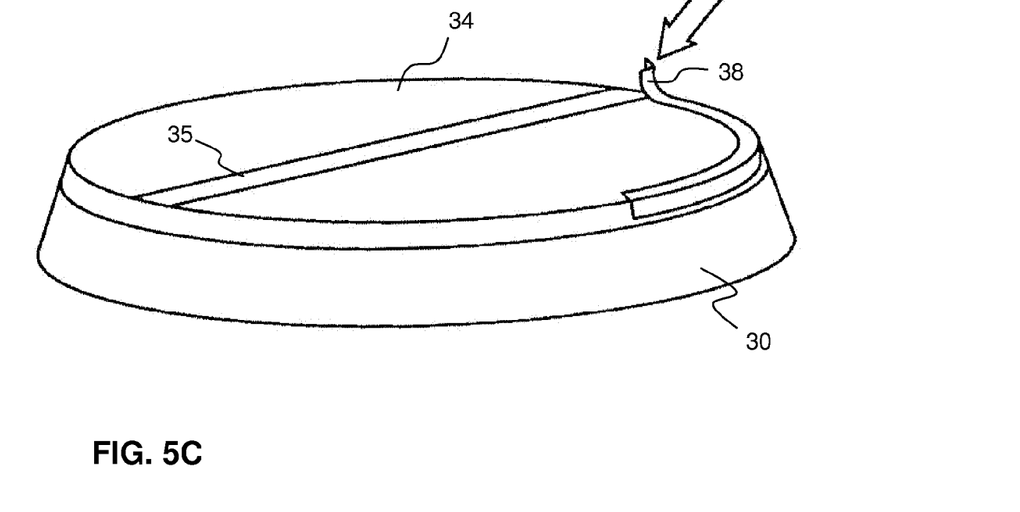
FIG. 5C is an exploded perspective view showing another construction stage.
Figure 5D:
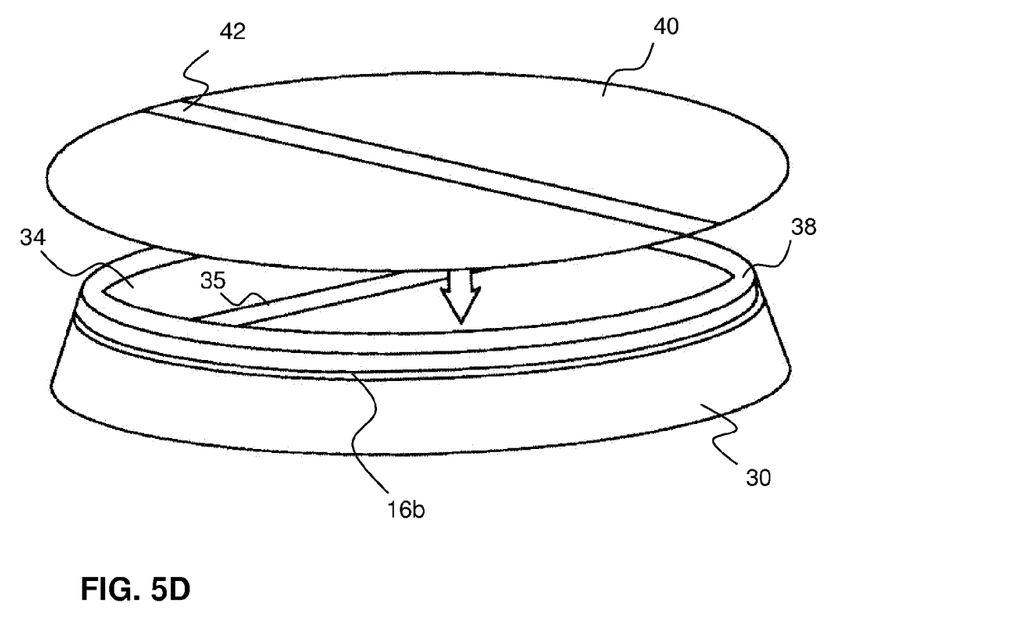
FIG. 5D is an exploded perspective view showing another construction stage.

Turning now to FIG. 5C, a sealing strip 38 comprising water degradable double-sided adhesive tape or the like may be optionally applied to seal the connection between the adhesive strip assembly 30 and the base member 34. As additionally shown in FIG. 5D, the adhesive on the upper side of the sealing strip 38 may be exposed and an optional water degradable base member cover 40 may be applied to cover the base member 32. The cover 40 may be sized to be larger than the base member 32. The cover 40 can be made of relatively thin, flexible material so that the outer peripheral portion thereof may then be crimped, folded or otherwise wrapped over the outer edge of the base member 34. This peripheral portion of the cover 40 will overlap the upper portion of the adhesive strip assembly 30, and will adhere to the sealing strip 38 and any exposed adhesive 16c. The cover 40 helps strengthen and seal the interconnection between the adhesive strip assembly 30 and the base member 32. As shown, the cover 40 may be formed from semicircular sections that are suitably joined together, as by water degradable tape 42.

Figure 5E:
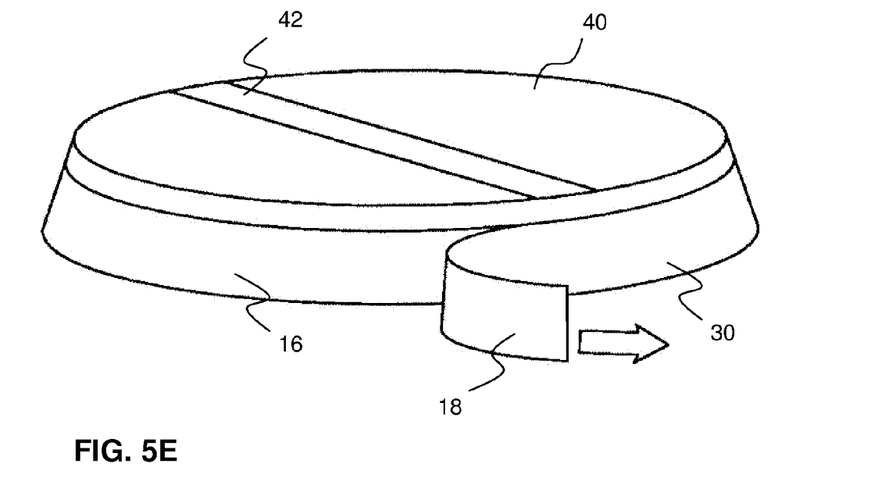
FIG. 5E is an exploded perspective view showing another construction stage.
Figure 5F:
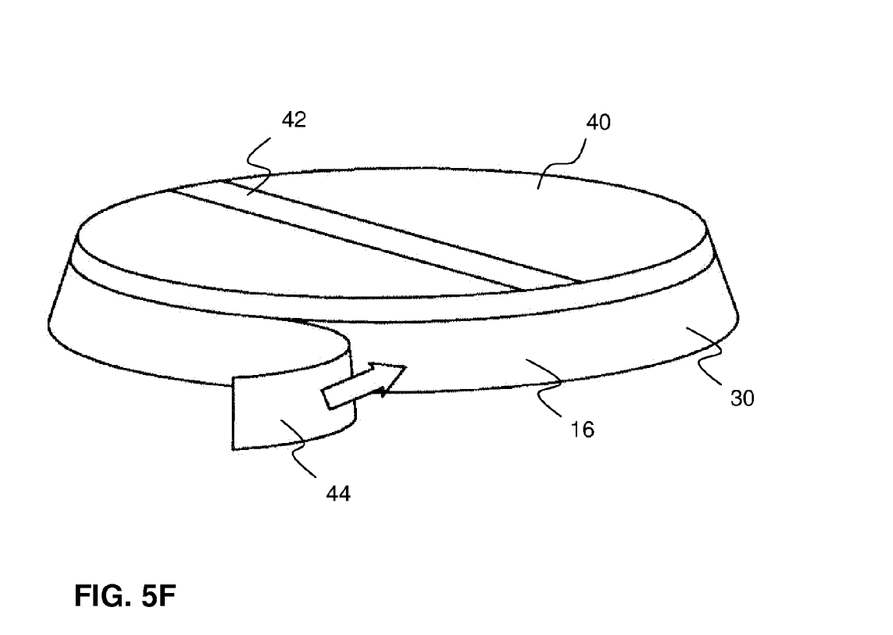
FIG. 5F is an exploded perspective view showing another construction stage.

Turning now to FIGS. 5E and 5F, the adhesive strip assembly 30 can be built up with auxiliary reinforcement members 44 of adhesive strip material (see FIG. 5F) to increase stiffness, if so desired. Each reinforcement member 44 may be formed as an adhesive strip segment comprising one or more layers of substrate material (including water degradable paper and polymer layers) to form an adhesive strip substrate of desired strength, stiffness and material(s). An adhesive layer 16 and a removable backing layer 18 will be provided on one side of the substrate portion. As shown, in FIG. 5E, the reinforcement members 44 may be attached by peeling off the removable backingl 8a from the adhesive strip assembly 30. As shown in FIG. 5F, this will expose the adhesive 16a, thereby allowing the reinforcement members 44 to be added. Although not shown, additional reinforcement layers could be added to the base member 32, either prior to or after the cover 40 is mounted.

It will be appreciated that the interconnection flaps 36 shown in FIGS. 5A and 5B could also be formed as part of the base member 32 instead of, or in addition to, the adhesive strip assembly 30. It should also be understood that interconnection elements other than flaps could be used. For example, an interconnection structure could be formed by extending one or more layers of the adhesive strip assembly 30 or the base member 32 to form a continuous circumferential tab or ledge that provides a seam element. This seam element could be bent, folded or crimped around the top edge of the mandrel 32 and connected to the remaining component to form a continuous seam. Alternatively, one or more independent interconnection elements could be used. Such interconnection elements would not be formed as part of the adhesive strip assembly 30 or the base member 32. Instead, the independent interconnection elements would be added during purge dam fabrication. By way of example, such elements could be implemented using pieces of a flexible adhesive tape that are capable of being bent, folded or crimped around the top edge of the mandrel 32. Alternatively, a flexible adhesive tape could be wrapped circumferentially and bent, folded or crimped around the top edge of the mandrel 32. This would be similar to the tape 38 of FIG. 5C. In each of the above examples, the interconnection structure is directly attached to the adhesive strip assembly 30 and the base member 32 to provide the primary interconnection, but may be built up with additional layers added during the assembly procedure to increase strength and stiffness. Again, this primary interconnection structure will typically be thinner than the nominal thickness of the adhesive strip assembly 30 and the base member 32, so that it can be bent, folded, crimped or otherwise manipulated during fabrication. Each of the additional layers will typically also be relatively thin and flexible in comparison to the adhesive strip assembly 30 and the base member 32 so that they can be easily bent, folded, crimped or otherwise manipulated when added to the purge dam structure during fabrication.

Figure 6:
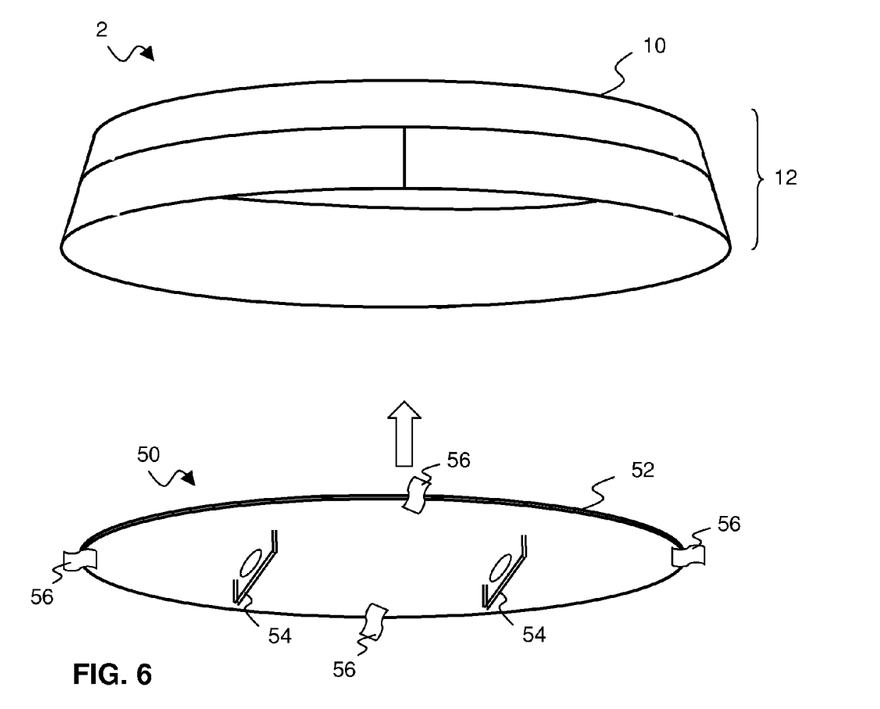
FIG. 6 is a perspective view showing a purge dam carrier that may be used to install the purge dam of FIG. 1.

Turning now to FIG. 6, an optional purge dam carrier 50 may be provided for installing purge dams 2 of relatively large size, such as more than 24 inches in diameter. The purge dam carrier 50 comprises a carrier main body 52 that is generally planar, disk-shaped, and sized to match the diameter of the main blocking portion 10 of the purge dam 2. The carrier main body 52 can be made from stiff paper, cardboard, wood, plastic, metal or other suitable material that is stiff enough to support the purge dam, yet preferably light in weight. A pair of handles 54 is formed or mounted on a carrier main body 52 for grasping the carrier.

During use, the carrier main body 52 is brought into engagement with the main blocking portion 10 of the purge dam 2. The carrier main body 52 can be attached to the purge dam 2 by any suitable releasable means of attachment, such as strips of releasable tape 56 or other attachment members. The attachment members can be simultaneously mounted to the carrier main body 52 and to the inner side of the purge dam wall portion 12. A pouch or other connection member(s) could also be formed on the inside of the purge dam base portion 10 to which the carrier main body 52 could be secured. Using the handles 54, the purge dam 2 can be manipulated to a desired location within the air passage 14 (see FIG. 3). The purge dam wall portion 12 may then be attached to the air passage 14 while the purge dam is held in position using the carrier 50. Following installation, the carrier 50 is detached from the purge dam 2 and withdrawn from the air passage.

Accordingly, a purge dam for inert gas welding has been disclosed. While various embodiments of the invention have been described, it should be apparent that many variations and alternative embodiments could be implemented in accordance with the teachings set forth herein. It will therefore be understood that the invention is not to be in any way limited except in accordance with the spirit of the appended claims and their equivalents.

I claim:
1. A purge dam for retaining purge gas around a weld zone, comprising:
   a purge dam structure configured to substantially obstruct an air passage leading to said weld zone;
   said purge dam structure comprising a main blocking portion configured to substantially block said air passage and a wall portion configured to engage said air passage for attachment;
   said purge dam structure further comprising a layer of water degradable paper facing a layer of water degradable polymer;
   said water degradable polymer being more air-impermeable than said water degradable paper in order to increase the air-impermeability of said purge dam without increasing the thickness of said paper; and
   whereby said purge dam can be installed by placing said purge dam in said air passage and adhering said wall portion thereto.

2. A purge dam in accordance with claim 1, wherein said purge dam structure comprises an adhesive on said wall portion for adhering said purge dam to said air passage, said adhesive being adhered to said layer of water degradable polymer.

3. A purge dam in accordance with claim 1, wherein said water degradable polymer comprises polyvinyl alcohol.

4. A purge dam in accordance with claim 1, wherein said main blocking portion comprises a substantially planar base member, and wherein said wall portion comprises an adhesive strip that is adhered to a substantially planar peripheral portion of said base member such that a lateral edge portion of said adhesive strip extends beyond said peripheral portion of said base member and is oriented out of plane relative thereto for adhering said purge dam to said air passage.

5. A purge dam in accordance with claim 4, wherein said adhesive strip is adhered to said water degradable polymer layer of said base.

6. A purge dam in accordance with claim 4, wherein said adhesive strip comprises a layer of water degradable paper facing a layer of water degradable polymer, said water degradable polymer having an adhesive layer thereon.

7. A purge dam in accordance with claim 6, wherein said adhesive strip comprises two or more layers of said water degradable paper, said water degradable polymer, or both.

8. A purge dam in accordance with claim 6, wherein said adhesive layer on said water degradable polymer layer of said adhesive strip is adhered to said water degradable polymer layer of said base.

9. A purge dam in accordance with claim 4, wherein said base member and said adhesive strip each comprise two or more layers of said water degradable paper, said water degradable polymer, or both.

10. A purge dam in accordance with claim 4, further including a removable backing on said adhesive strip.

11. A purge dam for retaining purge gas around a weld zone, comprising:
   a base configured to provide a main blocking portion of said purge dam that substantially blocks an air passage leading to said weld zone;
   an adhesive strip attached to said base and configured to provide a wall portion of said purge dam that adheres to said air passage;

said adhesive strip comprising a substrate and a layer of adhesive on said substrate;

said adhesive strip being attached to said base by one or more interconnection elements that are formed as part of one or both of said base and said adhesive strip, or which are formed independently of said base and said adhesive strip;

said interconnection element(s) being relatively thin and flexible in comparison to said main blocking portion and said wall portion of said purge dam to facilitate bending, folding, crimping or other manipulation during purge dam fabrication;

whereby said purge dam can be installed by placing said purge dam in said air passage and adhering said adhesive thereto.

12. A purge dam in accordance with claim 11, further including a removable backing on said adhesive.

13. A purge dam in accordance with claim 11, wherein said water degradable polymer comprises polyvinyl alcohol.

14. A purge dam in accordance with claim 11, further including one or more additional material layers covering said interconnection element(s).

15. A purge dam in accordance with claim 14, wherein said one or more additional material layers comprises a cover having a first portion covering said base and a second portion covering part of said adhesive strip.

16. A purge dam in accordance with claim 15, wherein said second portion of said cover adheres to a medial portion of said adhesive strip having exposed adhesive.

17. A purge dam in accordance with claim 16, further including one or more reinforcement layers on said adhesive strip, said reinforcement layers comprising one or more additional adhesive strips.

18. A purge dam for retaining purge gas around a weld zone, comprising:

a purge dam structure configured to substantially obstruct an air passage leading to said weld zone; and a purge dam carrier adapted to engage said purge dam structure for carrying;

whereby said purge dam can be installed by placing said purge dam in said air passage using said purge dam carrier and adhering said purge dam structure thereto.

19. A purge dam in accordance with claim 18, wherein said purge dam carrier comprises handles mounted on a carrier main body that engages a main blocking portion of said purge dam.

20. A purge dam in accordance with claim 19, further including one or more attachment members for releasably attaching said carrier to said purge dam.

* * * * *